(12) United States Patent
Cercone et al.

(10) Patent No.: US 10,344,904 B2
(45) Date of Patent: Jul. 9, 2019

(54) STRENGTHENED POLYETHYLENE TUBULAR MEMBER

(71) Applicant: Milliken Infrastructure Solutions, LLC, Spartanburg, SC (US)

(72) Inventors: Lawrence Cercone, Littleton, CO (US); Daniel J. Bomar, Sr., Littleton, CO (US)

(73) Assignee: Milliken Infrastructure Solutions, LLC, Spartanburg, SC (US)

( * ) Notice: Subject to any disclaimer, the term of this patent is extended or adjusted under 35 U.S.C. 154(b) by 0 days.

(21) Appl. No.: 15/672,422

(22) Filed: Aug. 9, 2017

(65) Prior Publication Data
US 2019/0049057 A1    Feb. 14, 2019

(51) Int. Cl.
*F16L 55/16* (2006.01)
*F16L 55/168* (2006.01)
(Continued)

(52) U.S. Cl.
CPC .......... *F16L 55/1686* (2013.01); *B28B 21/64* (2013.01); *B29C 63/0069* (2013.01); *B29C 63/14* (2013.01); *B29C 70/74* (2013.01); *B29C 73/10* (2013.01); *F16L 9/12* (2013.01); *F16L 9/16* (2013.01); *F16L 55/175* (2013.01); *F16L 58/1063* (2013.01); *F16L 58/181* (2013.01); *B29C 70/30* (2013.01); *B29K 2023/00* (2013.01); *B29K 2105/0845* (2013.01); *B29K 2301/12* (2013.01); *B29K 2623/06* (2013.01); *F16L 55/1683* (2013.01); *F16L 57/02* (2013.01)

(58) Field of Classification Search
CPC ..... F16L 55/17; F16L 55/168; F16L 55/1683; F16L 55/1686

USPC ..... 138/99, 141, 137, 172, DIG. 1; 156/162, 156/172, 178, 187
See application file for complete search history.

(56) References Cited

U.S. PATENT DOCUMENTS

| | | | |
|---|---|---|---|
| 4,014,370 A | 3/1977 | McNulty | 138/144 |
| 5,266,195 A | 11/1993 | Hopkins | 210/321.74 |

(Continued)

FOREIGN PATENT DOCUMENTS

| | | |
|---|---|---|
| EP | 1 314 923 | 5/2003 |
| WO | WO 2014/075188 | 5/2014 |

OTHER PUBLICATIONS

Patent Cooperation Treaty PCT International Search Report. dated,Sep. 24, 2018. International Application No. PCT/US2018/043896. International Filing Date: Jul. 26, 2018.

*Primary Examiner* — Patrick F Brinson
(74) *Attorney, Agent, or Firm* — Cheryl J. Brickey (57) ABSTRACT

A strengthened polyethylene tubular member, where the polyethylene tubular member has an outer surface, a circumference, a wall thickness, an area to be strengthened, and the outer surface of the polyethylene tubular member contains polyethylene. The strengthened polyethylene tubular member contains a fabric layer wrapped around the circumference of the tubular member at least two full rotations and covering the area to be strengthened. The fabric layer contains a plurality of interwoven tape elements with a base layer of a strain oriented olefin polymer disposed between covering layers of a heat fusible olefin polymer. The tape elements within the fabric layer are bonded together and the tape elements adjacent the tubular member are bonded to the tubular member.

17 Claims, 6 Drawing Sheets

(51) Int. Cl.
*F16L 55/175* (2006.01)
*F16L 58/10* (2006.01)
*F16L 9/12* (2006.01)
*F16L 9/16* (2006.01)
*B28B 21/64* (2006.01)
*B29C 70/74* (2006.01)
*B29C 63/00* (2006.01)
*B29C 63/14* (2006.01)
*B29C 73/10* (2006.01)
*F16L 58/18* (2006.01)
*B29C 70/30* (2006.01)
*F16L 57/02* (2006.01)
*B29K 301/12* (2006.01)
*B29K 105/08* (2006.01)
*B29K 23/00* (2006.01)
*B29K 623/00* (2006.01)

(56) References Cited

U.S. PATENT DOCUMENTS

| | | | |
|---|---|---|---|
| 5,482,087 A * | 1/1996 | Overbergh | B29C 61/06 138/103 |
| 6,386,236 B1 | 5/2002 | Buckley | 138/99 |
| 6,543,487 B2 * | 4/2003 | Bazinet | B29C 53/8016 138/97 |
| 6,774,066 B1 * | 8/2004 | Souza | B32B 15/04 138/99 |
| 7,892,379 B2 | 2/2011 | Eleazer et al. | 156/182 |
| 7,938,146 B2 | 5/2011 | Brooks et al. | 138/99 |
| 8,365,774 B2 * | 2/2013 | Kamata | A61B 1/00071 138/99 |
| 8,418,337 B2 * | 4/2013 | Salama | B29C 70/086 138/172 |
| 8,424,571 B2 | 4/2013 | Brooks | 138/99 |
| 9,057,473 B2 | 6/2015 | Souza | 138/97 |
| 9,316,339 B1 | 4/2016 | Souza et al. | 138/99 |
| 2004/0007279 A1 | 1/2004 | Yamaguchi et al. | 138/125 |
| 2007/0071960 A1 | 3/2007 | Eleazer et al. | 428/297.7 |
| 2009/0017322 A1 | 1/2009 | Hayes et al. | 428/515 |
| 2013/0276932 A1 | 10/2013 | Taylor | 138/144 |
| 2015/0204475 A1 * | 7/2015 | Brooks | F16L 55/1683 138/99 |
| 2015/0204476 A1 * | 7/2015 | Lazzara | F16L 9/042 138/99 |
| 2016/0186909 A1 * | 6/2016 | Boulet D'Auria | F16L 58/16 138/99 |
| 2016/0281901 A1 * | 9/2016 | Souza | B29C 73/10 |
| 2016/0281902 A1 * | 9/2016 | Souza | B29C 73/10 |
| 2017/0100880 A1 | 4/2017 | Cercone et al. | |

* cited by examiner

STRENGTHENED POLYETHYLENE TUBULAR MEMBER

TECHNICAL FIELD

The present invention relates generally to polyolefin tubular members and other structures, and more particularly relates to a method and apparatus for repairing and/or joining polyolefin tubular members and other structures.

BACKGROUND

Polyolefin materials include the following: thermoplastic polyolefins: polyethylene (PE), polypropylene (PP), polymethylpentene (PMP), polybutene-1 (PB-1); Polyolefin elastomers (POE): polyisobutylene (PIB), ethylene propylene rubber (EPR), ethylene propylene diene monomer (M-class) rubber (EPDM rubber). Such materials, especially in a tubular configuration (i.e., tubular members), are utilized to deliver or convey an assortment of media that may have corrosive chemical properties. PE and PP tubular member is commonly used by gas utility companies, for example. Such tubular members themselves may be deployed in environments that also subject the exterior of the tubular member to corrosive or otherwise physically or chemically damaging conditions. Polyolefins are also materials from which various other types of structures, such as holding tanks, pressure vessels and the like, which may be deployed in harsh environments.

There are also various types of field connections that may be made to polyolefin tubular member. These include couplings such as tees, elbows, reducers, and so on. Field connections typically employ some form of crimping force to squeeze the joints together. This crimping process is known to introduce micro-cracks in the tubular member material. These micro-cracks can grow over time, due to cyclic pressures, exposure to temperature swings, material embrittlement, and so on, leading to failure or leaks.

Persons of ordinary skill in the art will appreciate that polyolefins are materials that by their very nature are difficult to bond to, due to their molecular density and low surface energy. This prevents most simple methods of bonding most types of materials to a polyolefin surface from being entirely effective. Consequently, there has heretofore been little that could be done to repair polyolefin structures that have become degraded by mechanisms such as described above. Tubular members may exhibit mechanical damage, including the growth of micro-cracks that can be induced from crimp connections. Of course, this is undesirable where such defects could allow for leaking, posing dangers to individuals or the environment.

When deploying polyolefin tubular member in a particular application, it is of course frequently necessary to join two sections of tubular member together end-to-end. One method of accomplishing this is by welding the tubular member sections together. In a common technique known as butt fusion, the two tubular member sections are heated by a welding plate in the form of a heated disk to cause the ends of the tubular members to become molten. The welding plate is then removed and the tubular member sections are pressed together with some predetermined force for some predetermined duration of time, depending upon wall thickness and tubular member diameter. The result is a weld joint that typically has a circumferential bead cap. There are known potential problems with such weld joints, due to stress differentials and the like that may exist in the heat-affected zone. Weld joints are susceptible to cracking over time, either due to external forces, such as soil movement or physical impact, or due to the material becoming brittle over time.

BRIEF SUMMARY

A strengthened polyethylene tubular member, where the polyethylene tubular member has an outer surface, a circumference, a wall thickness, an area to be strengthened, and the outer surface of the polyethylene tubular member contains polyethylene. The strengthened polyethylene tubular member contains a fabric layer wrapped around the circumference of the tubular member at least two full rotations and covering the area to be strengthened. The fabric layer contains a plurality of interwoven tape elements with a base layer of a strain oriented olefin polymer disposed between covering layers of a heat fusible olefin polymer. The tape elements within the fabric layer are bonded together and the tape elements adjacent the tubular member are bonded to the tubular member.

A method for strengthening a polyethylene tubular member. The polyethylene tubular member has an outer surface, a circumference, a wall thickness, and an area to be strengthened and the outer surface of the polyethylene tubular member contains polyethylene. The method contains the step of wrapping a fabric layer around the circumference of the tubular member at least two full rotations and covering the area to be strengthened. The fabric layer contains a plurality of interwoven tape elements with a base layer of a strain oriented olefin polymer disposed between covering layers of a heat fusible olefin polymer. The method also contains the step of applying heat and optionally pressure to the fabric layer bonding the tape elements of the fabric layer together and bonding the tape elements and the tubular member together.

BRIEF DESCRIPTION OF THE DRAWINGS

The present invention is best understood with reference to the following detailed description of embodiments of the invention when read in conjunction with the attached drawings, in which like numerals refer to like elements, and in which.

DETAILED DESCRIPTION

Figure 1:
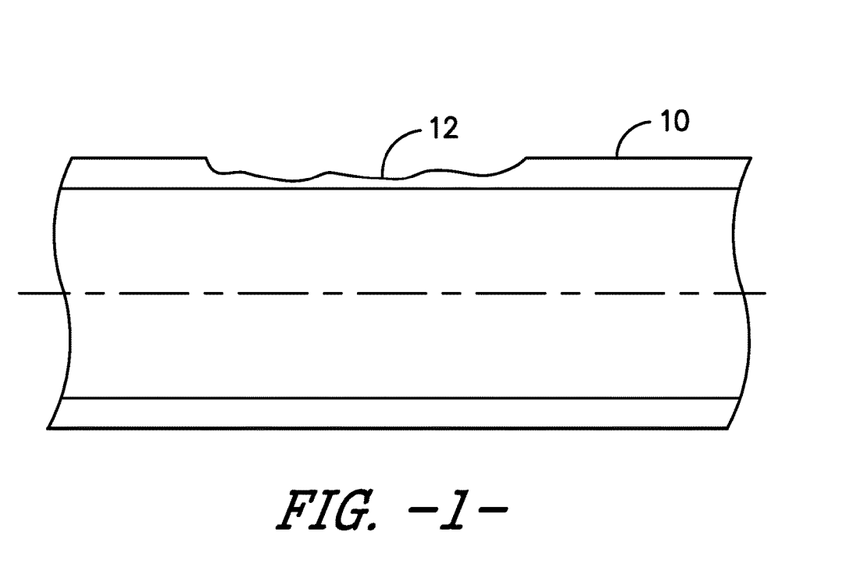
FIG. 1 is a side, longitudinal cross-sectional view of a length of tubular member to be repaired in accordance with one embodiment of the invention.

Referring to FIG. 1, there is shown a longitudinal, cross-sectional view of a section of a tubular member 10. The tubular member may 10 be many suitable thermoplastic, preferably polyolefin, preferably polyethylene (PE) or polypropylene (PP). Preferably the tubular member 10 comprises polyethylene as it is a relatively inexpensive material, is a popular for use in some pipes, and adheres well to the fabric layer of the invention. The polyethylene may be may suitable mono- or co-polymer of polyethylene including medium density polyethylene and high density polyethylene. In one embodiment, the tubular member wall contains more than one layer such as a metal tubular member coated with a layer of polyethylene on the outer surface of the metal. In the instances of multi-layered pipe walls, the outer-most layer which forms the outer surface of the tubular member 10 contains polyolefin, preferably polyethylene.

The tubular member 10 may be any tubular shaped member that moves or holds material within the member. In one preferred embodiment, the tubular member 10 may be a pipe, also referred to as a conduit, pipe, duct, and pipeline. The tubular member may also be a holding tank (typically spherically or ellipsoid) or any other hollow member preferably having a generally circular or elliptical cross-sectional shape.

Figure 4:
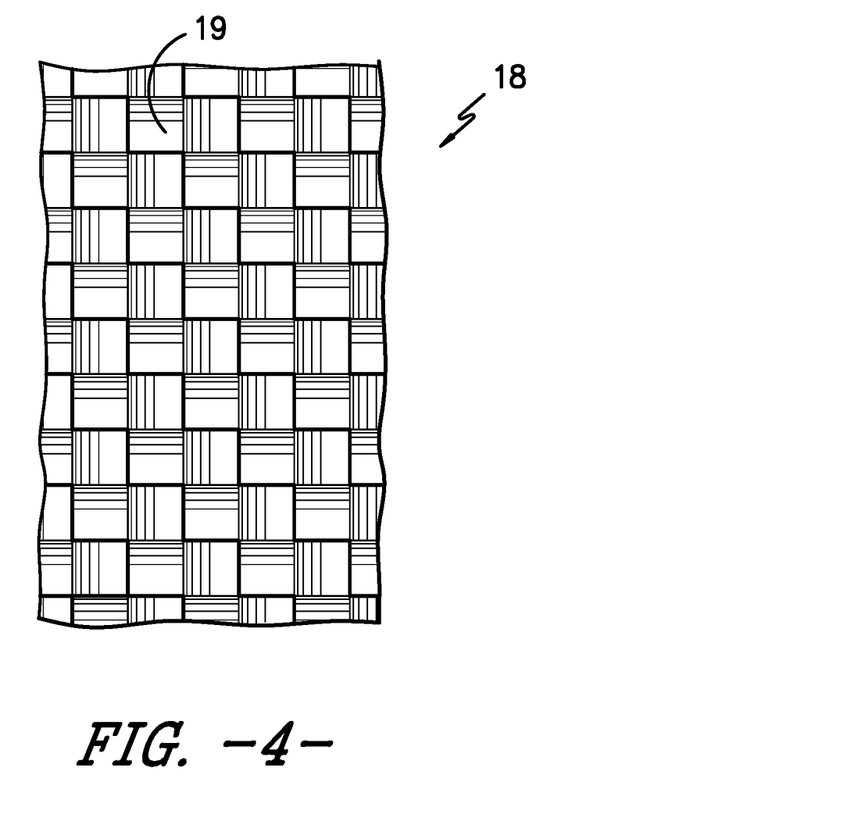
FIG. 4 is a top view illustration of one embodiment of the fabric layer.

As shown in FIG. 1, tubular member 10 has an area to be reinforced 12 on/in tubular member 10. This area to be reinforced 12 is the area to be strengthened by the reinforcement system and may contain gouges, holes, pinholes, cracks, microcracks, butt splices. In one embodiment, the area to be reinforced 12 is a damaged area which damage extends at least partially through the wall of the tubular member 10. It may go only part way through the tubular member's wall or completely through the wall. Any concave deviation from a smooth outer surface may be considered a damage, defect, or crevice. Preferably, the damage has a depth of at least about 10% of the pipe wall thickness. In another embodiment, the defect has a depth of at least about 20%, 30%, or 50% of the pipe wall thickness. In another embodiment, the defect has a depth of the entire pipe wall thickness. In another embodiment, the area to be reinforced 12 is an area where a clamp was used on the tubular member 10 resulting in microcracks. In another embodiment such as shown in FIG. 4, the area to be reinforced 12 is where two tubular members (20, 22) meet, where the area to be reinforced being the splice connecting two pipes.

The first step in reinforcing a tubular member 10 is to uncover the member 10 (in the case where there are additional layers on the member 10 or the member 10 is buried in the ground) and optionally clean the outer surface of the tubular member 10 to ensure good bonding of subsequent layers to the member 10. The member 10 may be cleaned with any suitable cleaner including water, methanol, isopropyl alcohol, and methyl ethyl ketone (MEK).

Figure 2:
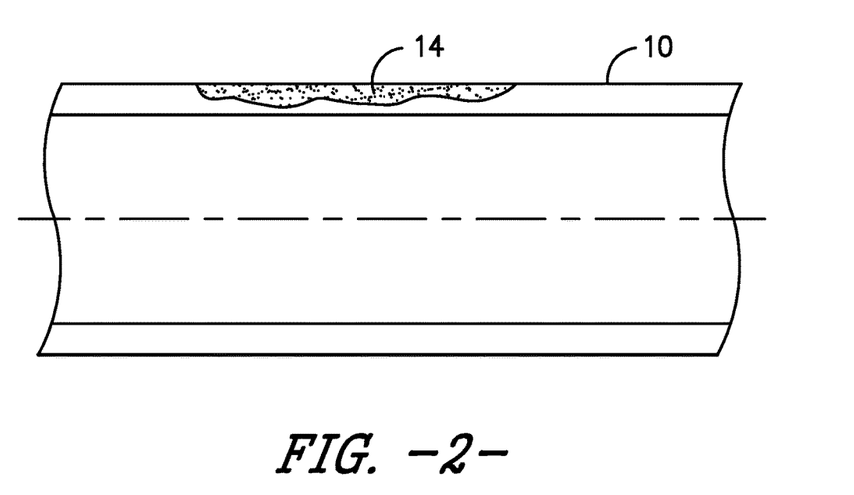
FIG. 2 is a side, longitudinal cross-sectional view of the tubular member from FIG. 1 having a filler material applied in an area to be reinforced thereof.

Optionally, the defect is then filled with a filler material 620 as shown in FIG. 2. The filler may be any suitable filler material including, but not limited to, polyester, epoxy, vinyl ester, polyurethane, thermoplastic material, rubber compound, or acrylic, such as a methyl acrylate or thermoplastic material. After the filler material has been applied and cured or otherwise hardened, it is then optionally sanded or otherwise removed so that the surface of the filled defect is approximately equal to the outer surface of the pipe 600. The pipe 600 may be optionally cleaned again after the filler is applied and/or sanded.

Figure 3A:
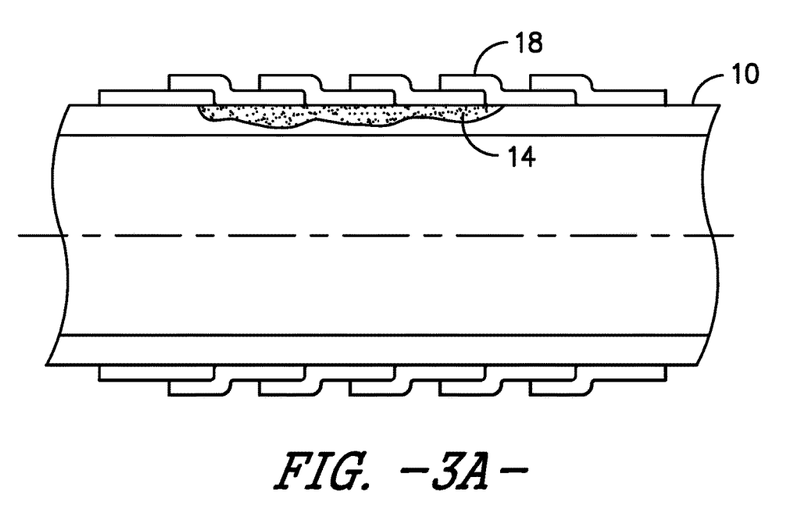
FIG. 3A is a side, longitudinal cross-sectional view of the tubular member from FIG. 2 having a reinforcement system applied over the repair area

Next, the reinforcing system is applied to the area to be reinforced 12 of the member 10. The reinforcing system comprises wrapping a fabric layer 18 around the circumference of the tubular member at least two full rotations and covering the area to be strengthened 12 as shown in FIG. 3A. Preferably, the fabric layer 18 is wrapped around the circumference of the tubular member at least four full rotations, covering the area to be strengthened 12. The fabric layer 18 comprises a plurality of interwoven tape elements comprising a base layer of a strain oriented olefin polymer disposed between covering layers of a heat fusible olefin polymer. In one embodiment, the fabric layer is wrapped in a hoop or spiral wrapping pattern. Preferably, the fabric layer consists essentially of thermoplastic polymer.

Preferably the fabric layer 18 is a woven fabric comprising a plurality of interwoven tape elements 19 as shown in FIG. 4. The woven fabric layer 18 comprising tape elements 19 in a warp direction and tape elements 19 in a weft direction which is approximately perpendicular to the warp direction. Preferably, the woven fabric layer 18 has a thickness of between about 0.05 mm and 0.35 mm, more preferably between about 0.10 mm and 0.20 mm.

The tape elements 19 (shown in cross-section in FIG. 5) comprise a base layer 30 of a strain oriented olefin polymer disposed between covering layers 32, 32' of a heat fusible olefin polymer. The tape elements 19 within the woven fabric layer 18 are interwoven and crossover each other at crossover points and once heat is supplied, the tape elements 19 are bonded to other tape elements 19 at crossover points and the outer surface of the member. The term "bonded" means held together, adhered, or attached and may also be referred to as fused. This bonding or fusing may be accomplished by using heat to partially melt and bond the elements together or by using an additional adhesive that may be heat, light, or monomer initiator, or UV activated.

Figure 5:
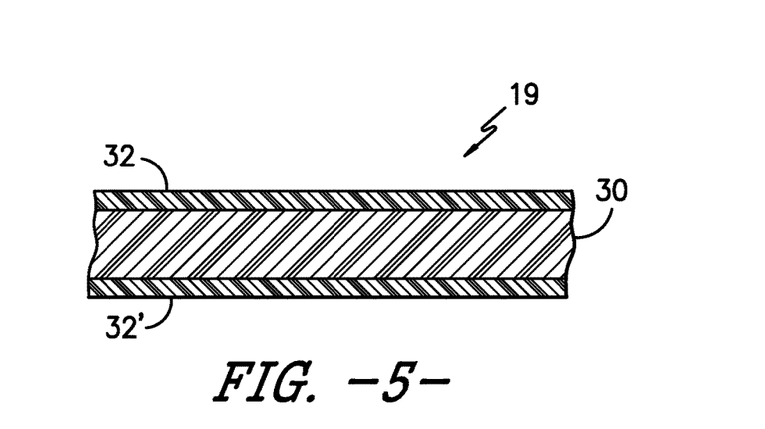
FIG. 5 is a cross-sectional illustration of one embodiment of the tape elements.

Preferably, the tape elements 19 are monofilament fibers having a rectangular cross-section and are continuous. The tape element 19 is considered to have a rectangular cross-section even if one or more of the corners of the rectangular are slightly rounded or if the opposing sides are not perfectly parallel. Having a rectangular cross-section may be preferred for a variety of reasons. Firstly, the surface available for bonding is greater. Secondly, during a de-bonding event the whole width of the tape is under tension and shear points are significantly reduced or eliminated.

In one embodiment, the tape elements 19 have a cross-sectional shape with a width between about 0.05 mm and 10 mm more preferably between about 0.1 mm and 5 mm and a height between about 10 μm and 500 μm more preferably between about 20 μm and 200 μm. In one embodiment, the aspect ratio comparing the width of the rectangular cross-section to the height of the rectangular cross-section is between about 0.25 and 500.

The tape elements 19 may be formed from any suitable material. Preferably, the tape elements comprise a thermoplastic polymer. Some suitable materials include, but are not limited to, polypropylenes, polyethylenes, polyesters, polyamides, polyethers, copolymers of any of the above; glass, aramid, carbon, ceramic, nylon, polyetherimide, polyamideimide, polyphenylene sulfide, polysulfones, polyimide, conjugated polymers, mineral fiber, natural fibers, metallic fiber or mixtures thereof. In one embodiment, the tape elements 50 have a tensile modulus of greater than 10 grams per denier as measured by ASTM method 3811-07 and/or a tensile strength of at least 100 MPa. In one embodiment, the tape elements comprise polypropylene. Polypropylene may be preferred for some applications due to its strength, ability to be oriented, and low cost. In another embodiment, the tape elements comprise polyethylene (including a co-polymer of polyethylene). Polyethylene is also preferred for some applications due to its strength, ability to be oriented, and low cost.

In one embodiment, the tape elements 19 contain a base layer 30 of a strain oriented olefin polymer disposed between covering layers 32, 32' of a heat fusible olefin polymer as shown in FIG. 5. Alternatively, it is contemplated that only a single covering layer may be present. The base layer of the tape elements is preferably compatibly bonded to each of covering layers between their contiguous surfaces. It is further contemplated that the covering layers have a softening temperature, or melting temperature, lower than that of the base layer. The base layer may be, but is not limited to, a polyolefin polymer such as polypropylene, polyethylene, a polyester such as polyethyleneterephthalate, or a polyamide such as Nylon 6 or Nylon 6-6. According to one potentially preferred practice, the base layer may be polypropylene or polyethylene. The base layer may account for about 50-99 wt. % of the tape element, while the covering layers account for about 1-50 wt. % of the tape element. Preferably, the base and covering layers are made up of the same class of materials to provide an advantage with regard to recycling and adhesion.

In an embodiment where the base layer 30 contains polypropylene, the material of covering layers is preferably a copolymer of propylene and ethylene or an α-olefin and has a lower melting temperature than the base layer. One example of a suitable tape element is TEGRIS™ available from Milliken & Company.

The tape elements 19 may be produced in any suitable manner. In one embodiment, the tape elements 19 may be formed by slitting a film. The film may be formed by any conventional means of extruding such multilayer polymeric films. By way of example, and not limitation, the film may be formed by blown film or cast film extrusion. The film is then cut into a multiplicity of longitudinal strips of a desired width by slitting the film to yield tape elements having the desired cross-sections. The tape elements 19 may then be drawn in order to increase the orientation of the tape element so as to provide increased strength and stiffness of the material. In another embodiment, an already oriented (mono or bi axially) film is then slit into tape elements.

In another embodiment, the tape elements 19 are extruded from a slit die then oriented. The process begins with slit extruding molten polymer to form fibers having a rectangular cross-section. The die typically contains between 5 and 60 slits, each one forming a fiber. In one embodiment, the each slit die has a width of between about 15 mm and 50 mm and a thickness of between about 0.6 and 2.5 mm. The fibers once extruded are typically 4 to 12 mm wide and after drawing are typically 1 to 3 mm wide. The fibers may be extruded having one layer or may have a second layer and/or a third layer using co-extrusion.

The woven fabric layer 18 may be any suitable textile layer. This includes but is not limited to a woven but may also be a nonwoven, unidirectional, or knit textile. In one embodiment, the weft tape elements and the warp tape elements are formed into a so called plain weave wherein each weft tape element passes over a warp tape element and thereafter passes under the adjacent warp tape element in a repeating manner across the full width of the woven layer. However, it is also contemplated that any number of other weave constructions as will be well known to those of skill in the art may likewise be utilized. By way of example only, and not limitation, it is contemplated that the weft tape elements may pass over two or more adjacent warp tape elements before transferring to a position below one or more adjacent warp fibers thereby forming a twill weave. The term "interwoven" is meant to include any construction incorporating inter-engaging formation fibers. In one embodiment, the woven layers are, for example, plain, satin, twill, basket-weave, poplin, jacquard, and crepe weave woven layers. Preferably, the woven layers are either a plain or twill weave woven layer. It has been shown that plain weaves have good abrasion and wear characteristics. A twill weave has been shown to have good aesthetic properties.

Once the fabric layer 18 has been wrapped around the member 10 at least two full rotations and completely covering the area to be reinforced 12, heat and optionally pressure is applied to the reinforcement (and member) binding the tape elements 19 of the fabric layer 18 together and bonding the tape elements 19 and the tubular member 10 together. Preferably, the tape elements 19 of the fabric layer 18 are adjacent to and in intimate contact with the outer surface of the tubular member 10. This means that there are no additional adhesives, glues, films, or other bonding agents between the fabric layer 18 and the member 10.

Energy (preferably in the form of heat) is then applied to the wrapped fabric layer 18. Energy may be applied by any suitable energy delivery system. The energy delivered is preferable heat, but may also be UV light or any other energy that causes the tape elements within the fabric layer 18 to bond to other tape elements 19 and to the outer surface of the member 10. In a preferred embodiment, the energy is delivered as heat. The heat may be supplied in any suitable form, preferably hot or heated air such as from a hot air blower. Preferably, the heat is applied until the pipe surface reaches a temperature of at least about 200° F., more preferably at least about 250° F., more preferably at least about 300° F.

In one embodiment, an energy delivery system in the form of an energy delivery machine as described in US 20170100880 Cercone et al. "Process and Machine for Reinforcing a Thermoplastic Pipe" filed Oct. 13, 2015 could be employed, the patent application publication is incorporated herein.

Figure 3B:
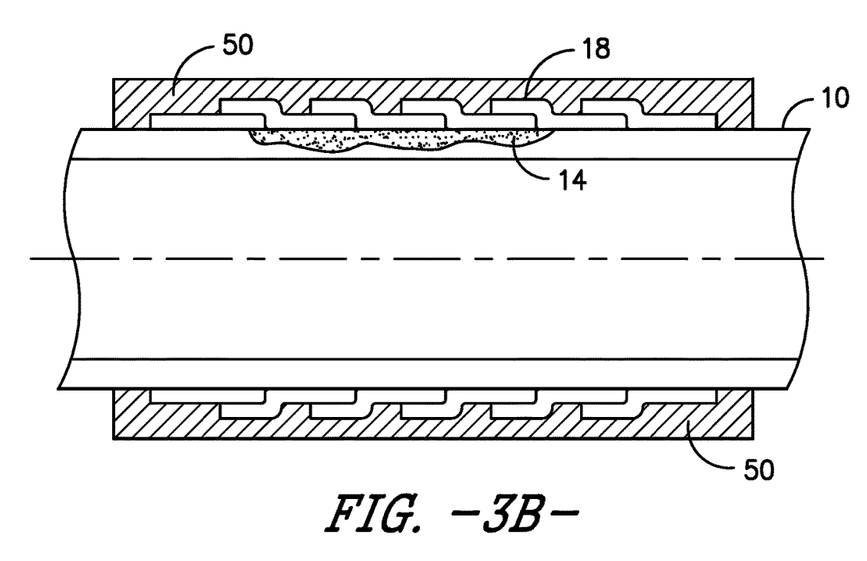
FIG. 3B is a side, longitudinal cross-sectional view of the tubular member from FIG. 3A with a heat shrink film.

Heat may be applied in any suitable method, preferably one that can be used out in the field such as heat guns, blow dryers, torches, and heated air. Pressure may also be applied while heating. The pressure can be delivered by a cuff or wrapping, or preferably heat shrink film. Preferably, the heat shrink film is applied before heat is applied and is removed after the member and fabric layer have cooled. Preferably, the heat shrink film extends onto the outer surface of the member at least about 1 inch past the wrapped fabric layer. This heat shrink film 50 can be seen in FIG. 3B.

Optionally, pressure may be used to create better and stronger bonding. In one embodiment, a constrictor wrapping is wrapped around the circumference of the pipe over the fabric layer 18. The constrictor wrapping is preferably a stretch polyolefin film treated with a release agent that applies hoop pressure to the fabric layer 18 while it cures insuring intimate contact between adjacent layers of the fabric and the outer surface of the member 10. In some embodiments, this film is perforated to allow reaction gasses to escape during cure. In one preferred embodiment, the constrictor wrapping is a shrink wrap that as it is heated, contracts to provide additional pressure to the fabric layer 18 and member 10. If a constructor wrapping was used, then it may be removed after the heating is finished (or it can be left in place if desired).

When deploying polyolefin pipe in a particular application, it is frequently necessary to join two sections of pipe together end-to-end. One method of accomplishing this is by welding the pipe sections together. In a common technique known as butt fusion, the two pipe sections are heated by a welding plate in the form of a heated disk to cause the ends of the pipes to become molten. The welding plate is then removed and the pipe sections are pressed together with some predetermined force for some predetermined duration of time, depending upon wall thickness and pipe diameter. The result is a weld joint that typically has a circumferential bead cap. There are known potential problems with such weld joints, due to stress differentials and the like that may exist in the heat-affected zone. Weld joints are susceptible to cracking over time, either due to external forces, such as soil movement or physical impact, or due to the material becoming brittle over time. The splice itself or the partial or full failure of a splice may be considered a defect.

There are also various types of field connections that may be made to polyolefin pipe. These include couplings such as tees, elbows, reducers, and so on. Field connections typically employ some form of crimping force to squeeze the joints together. This crimping process is known to introduce micro-cracks in the pipe material. These micro-cracks can grow over time, due to cyclic pressures, exposure to temperature swings, material embrittlement, and so on, leading to failure or leaks. The micro-cracks may be considered to be defects.

In addition to providing a means of effectuating structural repair of members having defects in the wall, it is contemplated that the present invention may be employed to create a joint between two sections of tubular member, circumventing the need for a conventional butt fusion operation. This is shown in FIGS. 6-7.

Figure 6:
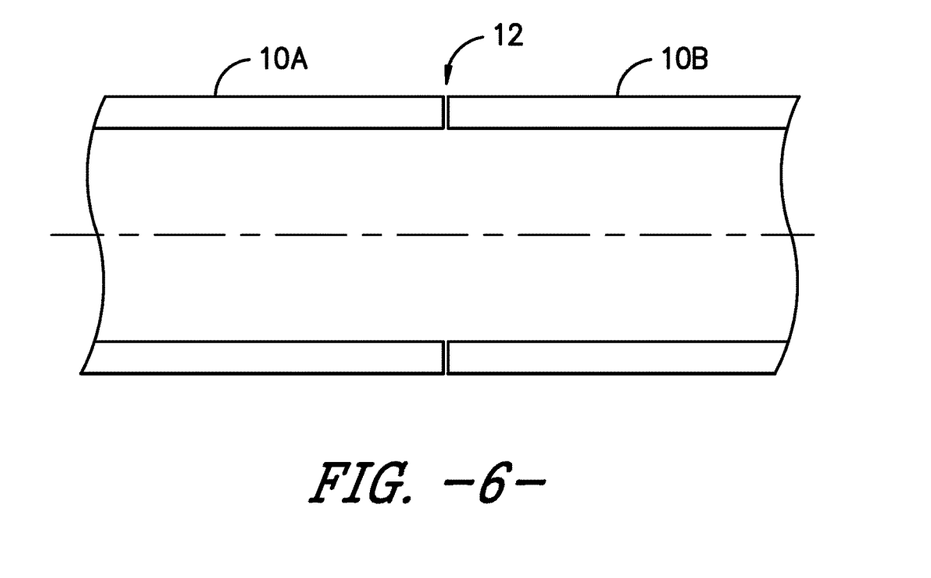
FIG. 6 is a side, longitudinal, cross-sectional view of two sections of tubular member aligned end-to-end in preparation for a joining operation in accordance with one embodiment of the invention.
Figure 7A:
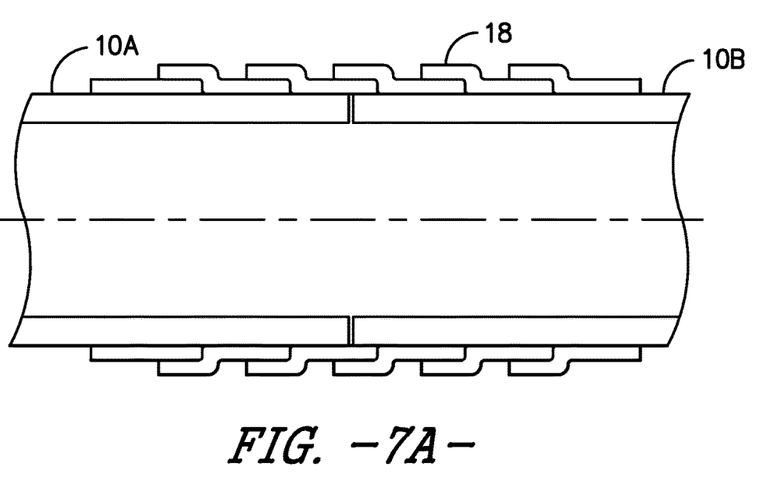
FIG. 7A is a side, longitudinal, cross-sectional view of the two sections of tubular member from FIG. 4 with the joint reinforced in accordance with one embodiment of the invention
Figure 7B:
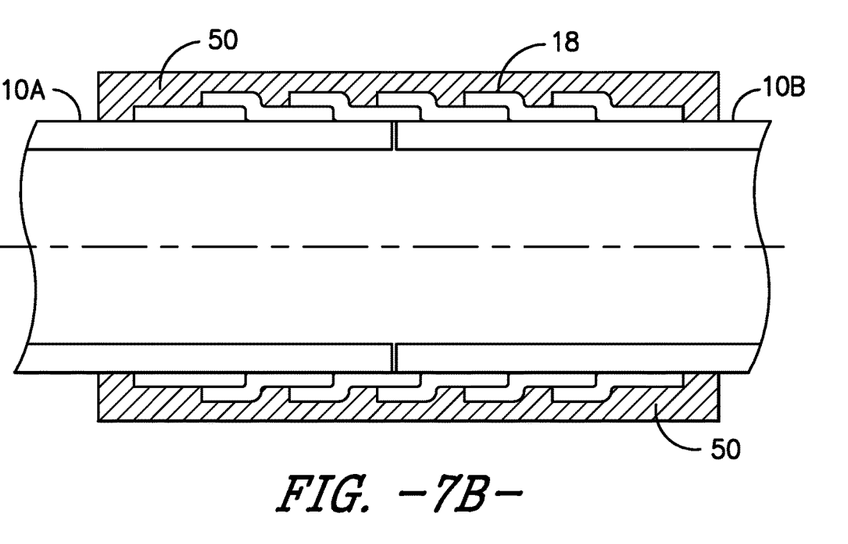
FIG. 7B is a side, longitudinal cross-sectional view of the tubular member from FIG. 7A with a heat shrink film.
Figure 8:
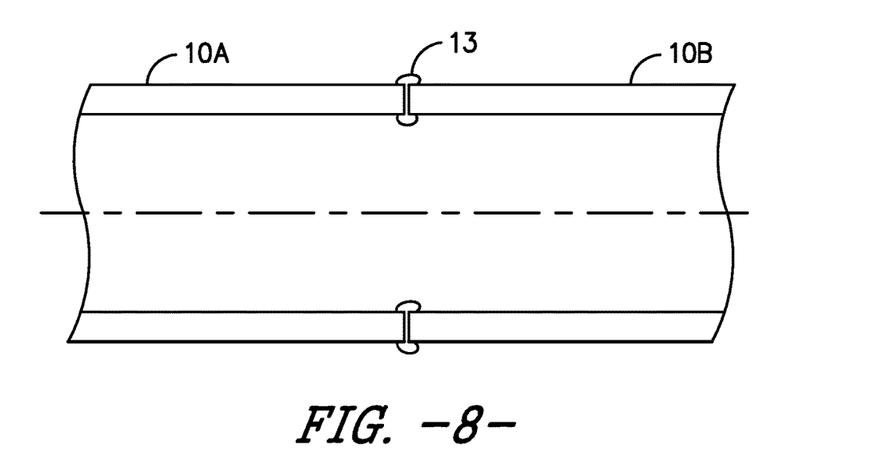
FIG. 8 is a side, longitudinal, cross-sectional view of two sections of tubular member having been welded together using a conventional butt fusion technique.
Figure 9:
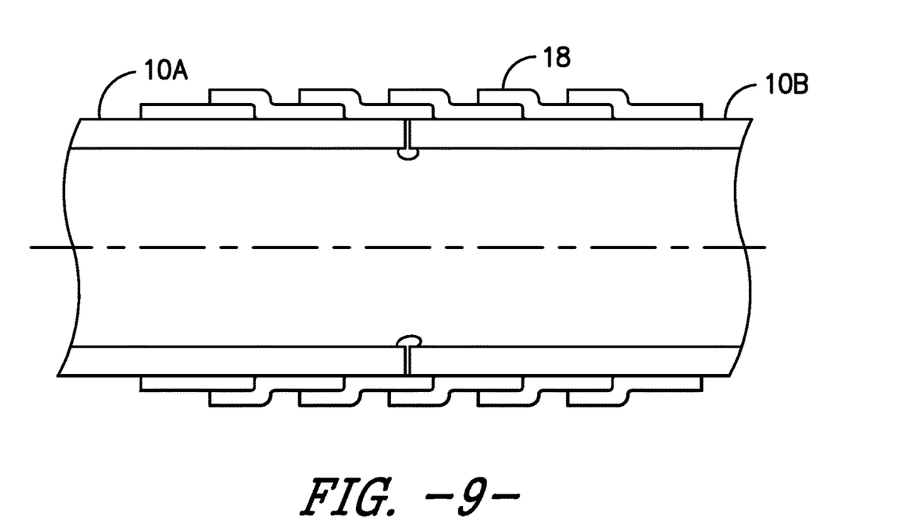
FIG. 9 is a side, longitudinal, cross-sectional view of the two welded sections of tubular member from FIG. 6 with the joint reinforced in accordance with one embodiment of the invention.

In FIG. 6, there is shown a longitudinal, cross-sectional view of two members 10A and 10B oriented end-to-end in preparation of the creation of a joint there between. The splice area is the area to be reinforced 12. The fabric layer 18 is wrapped around the area to be reinforced 12 and then is heated (with optional pressure) as described before resulting in the cross-section diagram of FIG. 7A. The system may further comprise wrapping a heat shrink film 50 around the fabric layer before applying heat and optionally pressure such as shown in FIG. 7B. In one embodiment, the heat shrink film 50 extends on the outer surface of the tubular member at least about 1 inch past the fabric layer. If desired, a bead of material 13 may be used to fill any gaps between the two members 10A, 10B or help adhere them together. FIGS. 8 and 9 illustrate the invention using material 13 to fill the gap between the butt joint.

Two or more members may also be placed end to end within a coupler such that their respective ends are within the coupler. In this embodiment, the entire coupler area would be considered to be the area to be reinforced and the fabric layer 18 would cover the coupler and extend at least about 1 inch into the members. The coupler may be made of any suitable material such as metal, or a polymer. It may be made of the same or different materials than the tubular members. The coupler may contain more than two tubular members, such as three, four, or more members. The ends of the tubular members to be joined together must reside within the coupler, but they do not have to be physically touching. In one embodiment, the ends of the tubular members are in physical contact touching with nothing else between them. In another embodiment, the ends are close to each other, being separated by less than about 5 millimeters, more preferably less than 3 millimeters. In another embodiment, the ends are separated by a more substantial distance, between about 0.5 and 2 inches. In another embodiment, there is a material located between the ends of the tubular members, such as formed during butt fusion, adhesives, gaskets, or any other suitable material.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A strengthened tubular member comprising:
a polyethylene tubular member having an outer surface, a circumference, a wall thickness, and an area to be strengthened, wherein the outer surface of the polyethylene tubular member comprises polyethylene;
a fabric layer wrapped around the circumference of the tubular member at least two full rotations and covering the area to be strengthened, wherein the fabric layer comprises a plurality of interwoven tape elements comprising a base layer of a strain oriented olefin polymer disposed between covering layers of a heat fusible olefin polymer, wherein the tape elements within the fabric layer are bonded together and the tape elements adjacent the tubular member are bonded to the tubular member; and, a heat shrink film wrapped around the tubular member at least covering the fabric layer.

2. The strengthened tubular member of claim 1, wherein the tape elements are adjacent to and in intimate contact with the tubular member.

3. The strengthened tubular member of claim 1, wherein the fabric layer is wrapped around the circumference of the tubular member at least four full rotations.

4. The strengthened tubular member of claim 1, wherein the heat shrink film extends on the outer surface of the tubular member at least about 1 inch past the fabric layer.

5. The strengthened tubular member of claim 1, wherein the fabric layer is wrapped in a hoop or spiral wrapping pattern.

6. The strengthened tubular member of claim 1, wherein the area to be strengthened comprises a damaged area extending from the outer surface of the tubular member at least partially through the wall thickness.

7. The strengthened tubular member of claim 1, wherein the fabric layer consists essentially of thermoplastic polymer.

8. A system of joined polyethylene tubular members comprising:

at least two the polyethylene tubular members having an outer surface, a circumference, and a wall thickness, wherein the outer surfaces of the polyethylene tubular members comprise polyethylene, wherein respective ends of the tubular members are placed together forming a joint;

a fabric layer wrapped around the joint at least two full rotations, wherein the fabric layer comprises a plurality of interwoven tape elements comprising a base layer of a strain oriented olefin polymer disposed between covering layers of a heat fusible olefin polymer, wherein the tape elements within the fabric layer are bonded together and the tape elements adjacent the tubular members are bonded to the tubular members; and, a heat shrink film wrapped around the tubular member at least covering the fabric layer.

9. The system of claim 8, wherein the tape elements are adjacent to and in intimate contact with the tubular member.

10. The system of claim 8, wherein the fabric layer is wrapped around the circumference of the tubular member at least four full rotations.

11. The system of claim 8, wherein the heat shrink film extends on the outer surface of the tubular member at least about 1 inch past the fabric layer.

12. The system of claim 8, wherein the fabric layer is wrapped in a hoop or spiral wrapping pattern.

13. The system of claim 8, wherein the tubular members are joined end to end.

14. A system of joined polyethylene tubular members comprising:

at least two the polyethylene tubular members having an outer surface, a circumference, and a wall thickness, wherein the outer surfaces of the polyethylene tubular members comprise polyethylene, wherein respective ends of the tubular members are placed together forming a joint, and wherein the tubular members are joined together using a coupler; and, a fabric layer wrapped around the joint at least two full rotations, wherein the fabric layer comprises a plurality of interwoven tape elements comprising a base layer of a strain oriented olefin polymer disposed between covering layers of a heat fusible olefin polymer, wherein the tape elements within the fabric layer are bonded together and the tape elements adjacent the tubular members are bonded to the tubular members.

15. The system of claim 14, wherein the method comprises joining two tubular members together.

16. The system of claim 14, wherein the method comprises joining three tubular members together.

17. The system of claim 8, wherein the fabric layer consists essentially of thermoplastic polymer.

* * * * *